United States Patent
Horii et al.

(10) Patent No.: US 9,634,305 B2
(45) Date of Patent: Apr. 25, 2017

(54) BATTERY MODULE WITH COVERING PLATES

(71) Applicant: HONDA MOTOR CO., LTD., Tokyo (JP)

(72) Inventors: Yoshiyuki Horii, Wako (JP); Toshiaki Takamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 557 days.

(21) Appl. No.: 13/792,517

(22) Filed: Mar. 11, 2013

(65) Prior Publication Data

US 2013/0244069 A1 Sep. 19, 2013

(30) Foreign Application Priority Data

Mar. 16, 2012 (JP) ................................ 2012-060228

(51) Int. Cl.
  *H01M 2/10* (2006.01)
  *H01M 10/48* (2006.01)
  *H01M 10/6563* (2014.01)
  *H01M 10/6571* (2014.01)
  *H01M 10/6566* (2014.01)

(52) U.S. Cl.
  CPC ........ *H01M 2/1072* (2013.01); *H01M 2/1077* (2013.01); *H01M 10/48* (2013.01); *H01M 10/6563* (2015.04); *H01M 10/6566* (2015.04); *H01M 10/6571* (2015.04)

(58) Field of Classification Search
  USPC ..... 429/149–160, 163–187; 29/623.1–623.5; 221/282; 206/703
  See application file for complete search history.

(56) References Cited

U.S. PATENT DOCUMENTS

| | | | | |
|---|---|---|---|---|
| 6,811,197 | B1 * | 11/2004 | Grabowski et al. | ......... 296/37.8 |
| 2010/0073005 | A1 * | 3/2010 | Yano | .................... H01M 2/1066 324/427 |
| 2010/0092845 | A1 * | 4/2010 | Spare | ................... H01M 2/1022 429/90 |

(Continued)

FOREIGN PATENT DOCUMENTS

| | | |
|---|---|---|
| CN | 1176020 | 3/1998 |
| CN | 102044646 | 5/2011 |

(Continued)

OTHER PUBLICATIONS

Machine Translation of Seo (KR 2003-0071264, published Sep. 2003, pp. 1-9).*

*Primary Examiner* — Imran Akram

(74) *Attorney, Agent, or Firm* — Rankin, Hill & Clark LLP

(57) ABSTRACT

A battery module includes a pair of side plates arranged along two wall faces, opposing to each other in a stacking direction of battery cells, of wall faces of the battery module, a lower plate that swingably supports one end of the pair of side plates by a hinge mechanism and that is arranged along one wall face of the battery module, and an upper plate that is arranged along the wall face of the battery module so as to be opposite to the lower plate, and that connects the other ends of the pair of side plates, wherein the side plates and the upper plate are tightened and fixed by use of a fastening member with pressure being applied in the stacking direction of the battery cells in order to fix the battery module.

17 Claims, 18 Drawing Sheets

(56) References Cited

U.S. PATENT DOCUMENTS

| | | | |
|---|---|---|---|
| 2010/0215998 A1 | 8/2010 | Byun et al. | |
| 2010/0310909 A1* | 12/2010 | Yun | H01M 2/206 429/90 |
| 2012/0094164 A1* | 4/2012 | Wuensche | 429/100 |
| 2012/0183833 A1* | 7/2012 | Ikeda | H01M 2/1077 429/121 |

FOREIGN PATENT DOCUMENTS

| | | | |
|---|---|---|---|
| JP | 2001-236937 | | 8/2001 |
| KR | 2003-0071264 | * | 9/2003 |

\* cited by examiner

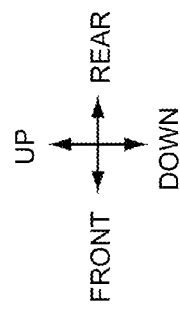
FIG. 4
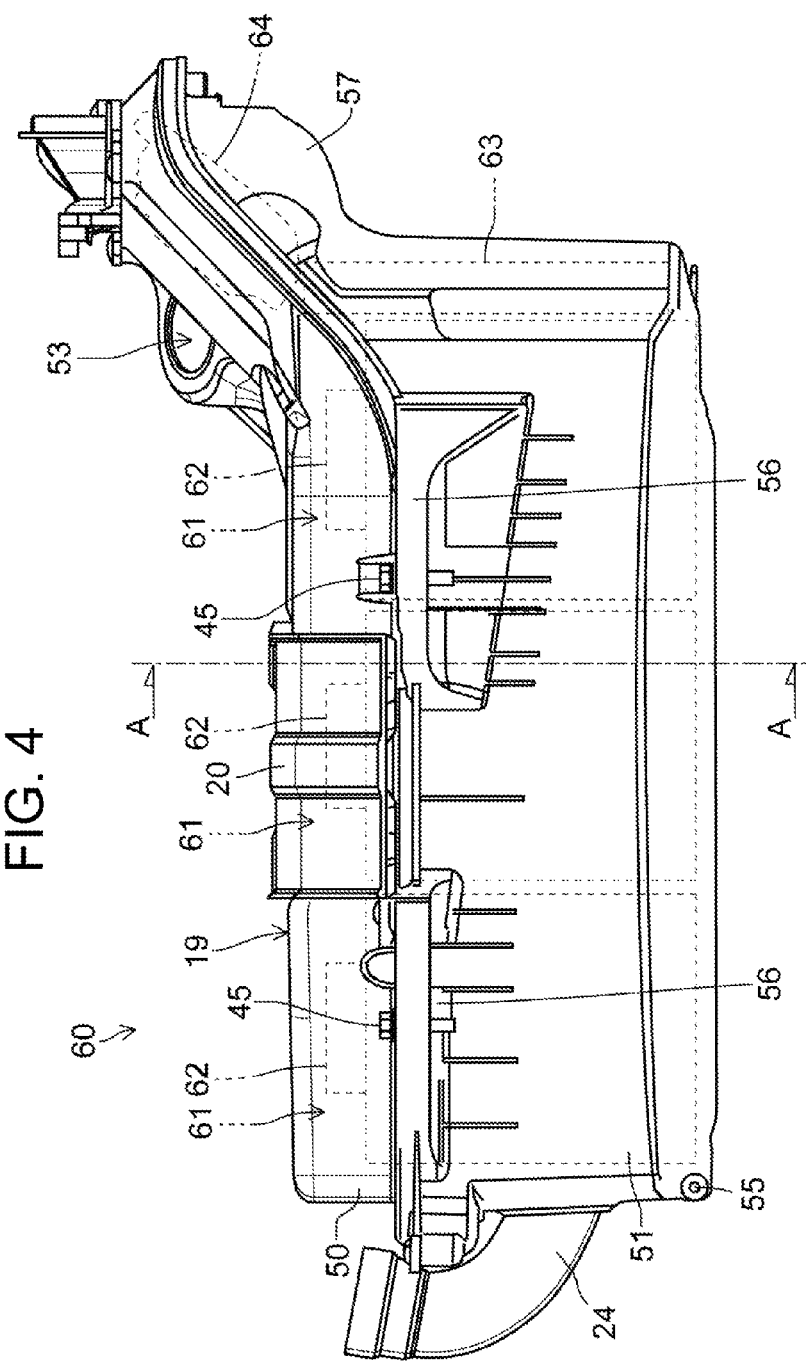

BATTERY MODULE WITH COVERING PLATES

BACKGROUND OF THE INVENTION

Field of the Invention

The present invention relates to a battery module, and more particularly to a battery module applied to an electric vehicle that travels by driving a motor with power of a battery.

Description of Related Art

There has conventionally been known that an assembled battery formed by collecting plural battery cells, i.e., a so-called battery module, is used as a battery for supplying power to a motor of an electric vehicle.

JP-A No. 2001-236937 describes a battery module formed by stacking plural tabular battery cells with a certain thickness, wherein both end faces of a battery cell group are sandwiched between a pair of plate-like members (constrained plates), and the plate-like members are fastened by a threaded connecting rod to apply pressure thereto, in order to prevent an expansion of each battery cell caused by a secular change or misalignment between the battery cells due to the expansion.

However, the technology described in JP-A No. 2001-236937 has a problem that the size of the whole battery module is liable to increase, since four connecting rods are mounted along the outer wall surface of the battery cell group, and a seating surface of a fastening nut for fastening the connecting rod has to be formed on the outer periphery of the constrained plate.

SUMMARY OF THE INVENTION

An object of the present invention is to address the problems of the related art, and to provide a battery module achieving downsizing of the whole battery module while applying a structure of preventing expansion of a battery cell.

In order to attain the foregoing object, according to a first aspect of the present invention, there is provided a battery module having a shape of a generally rectangular solid, and formed by stacking plural rectangular battery cells. The battery module includes at least four plates covering the battery module from four directions, and at least two hinge mechanisms located on the corner of the battery module and supporting the plates so as to be relatively swingable. The plates include a pair of side plates arranged along two wall faces, opposing to each other in a stacking direction of the battery cells, of wall faces of the battery module. The lower plate swingably supports one end of the pair of side plates by the hinge mechanism and is arranged along one wall face of the battery module. The upper plate is arranged along the wall face of the battery module so as to be opposite to the lower plate and connects the other ends of the pair of side plates to each other. The pair of side plates and the upper plate are tightened and fixed by use of a fastening member with pressure being applied in the stacking direction of the battery cells in order to fix the battery module.

Since the hinge mechanism is used as the tightening structure of the battery module, the externally protruding amount of the components required for tightening the battery module is reduced, whereby a battery unit can be downsized.

In addition, the expansion of the battery module can be prevented with a simple structure. Since the side plate and the lower plate are connected by the hinge mechanism, the protruding amount of the components involved with the tightening structure to the outer peripheral direction of the battery module can be reduced, compared to the case in which both end faces of the battery module are sandwiched by a pair of plate members, and the plate members are tightened by a threaded connecting rod. Thus, the tightening structure of the battery module can be applied, and the battery unit can be downsized.

According to a second aspect, the battery module has a structure in which the battery cells and separators, which are arranged to secure a predetermined gap between the battery cells, are alternately stacked. Since the predetermined gap is formed between the battery cells, contact between the battery cells can be prevented, and the battery cell can easily be positioned. Since the predetermined gap is formed, a passage of air for cooling the battery cell can be secured.

According to a third aspect, the upper plate and the lower plate are respectively formed with penetration slits for passing cooling air flowing between the battery cells. Therefore, the flow of the cooling air passing between the battery cells is not hindered by the upper plate and the lower plate, so that the battery module can satisfactorily be cooled, while applying the tightening structure of the battery cell.

According to a fourth aspect, the separator is formed with cooling air slits provided in the position corresponding to the respective penetration slits in the upper plate and the lower plate, and positioning projections engaged with positioning holes formed respectively in the upper plate and the lower plate. Therefore, the separator has both a function of forming the cooling passage and a function of positioning the battery cell.

According to a fifth aspect, a voltage/thermal monitoring board for monitoring voltage of the battery cell is mounted on a surface of the upper plate. Therefore, compared to the structure in which the voltage/thermal monitoring board is provided apart from the battery module, the battery unit can be made compact because the space can effectively be utilized, and the components are concentrated.

According to a sixth aspect, a seat for supporting an electrode plate serving as an output terminal of the battery module is arranged on the surface of the upper plate. Therefore, the battery unit can be made compact because the space can effectively be utilized, and the components are concentrated.

According to a seventh aspect, the fastening member is a fastening screw that penetrates the upper plate to be threaded to the other end of the side plate. Therefore, even if the battery module might be expanded, force is applied in the direction orthogonal to the axial direction of the fastening screw, whereby the tightening state of the upper plate and the side plate can strongly be retained.

According to an eighth aspect, an insulation sheet is provided between the side plate and the battery module. Therefore, the battery module and the side plate can be insulated with a simple structure without an increase in the size.

According to a ninth aspect, the battery module includes a battery holder functioning as an outer frame of the battery module for accommodating two battery cells, wherein the battery module is configured by arranging plural battery holders, each accommodating the battery cells, the battery holder is configured such that a predetermined gap is formed between the adjacent same battery holders, and the battery holder is formed with a communication window for allowing a explosion-proof window formed on the battery cell to be exposed to the outside. Therefore, the battery cell can easily be positioned by the battery holder. In addition, the function of the explosion-proof window is not disturbed even with the battery cells being accommodated in the battery holder.

According to a tenth aspect, the battery holder accommodates the two battery cells by connecting a left battery holder and a right battery holder, and when the left battery holder and the right battery holder are connected to each other, a semicolumnar pawl formed on the left battery holder and a semicolumnar pawl formed on the right battery holder are joined to each other to form a columnar projection serving as a positioning projection of the battery holder.

Therefore, the battery holder can be obtained that can accommodate the two battery cells on a predetermined position with respect to a case.

BRIEF DESCRIPTION OF THE DRAWINGS

FIG. 4 is a left side view of a battery unit.

DETAILED DESCRIPTION OF THE PREFERRED EMBODIMENTS

Embodiments of the present invention will be described in detail below with reference to the drawings.

Figure 1:
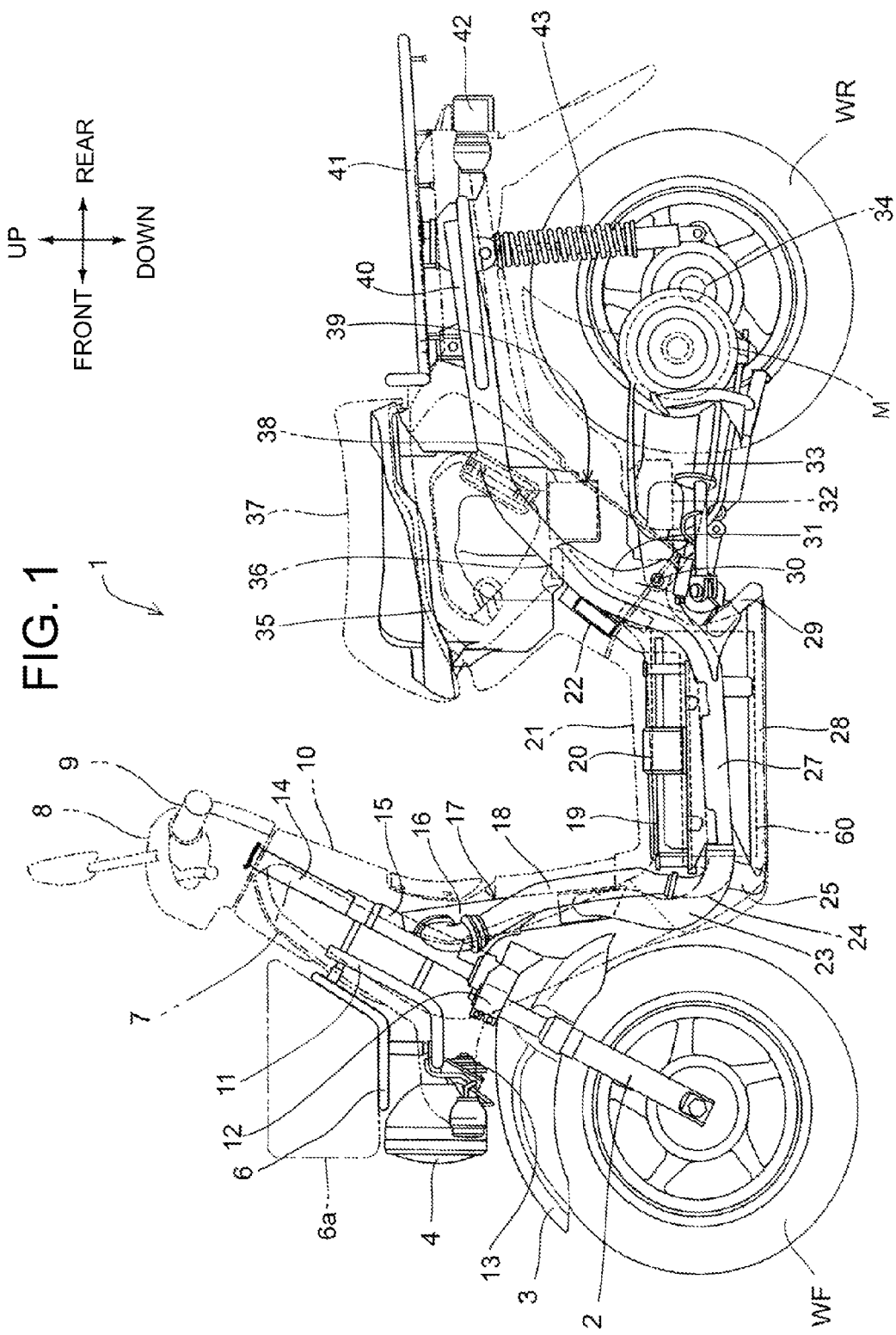
FIG. 1 is a perspective side view of an electric motorcycle.
Figure 2:
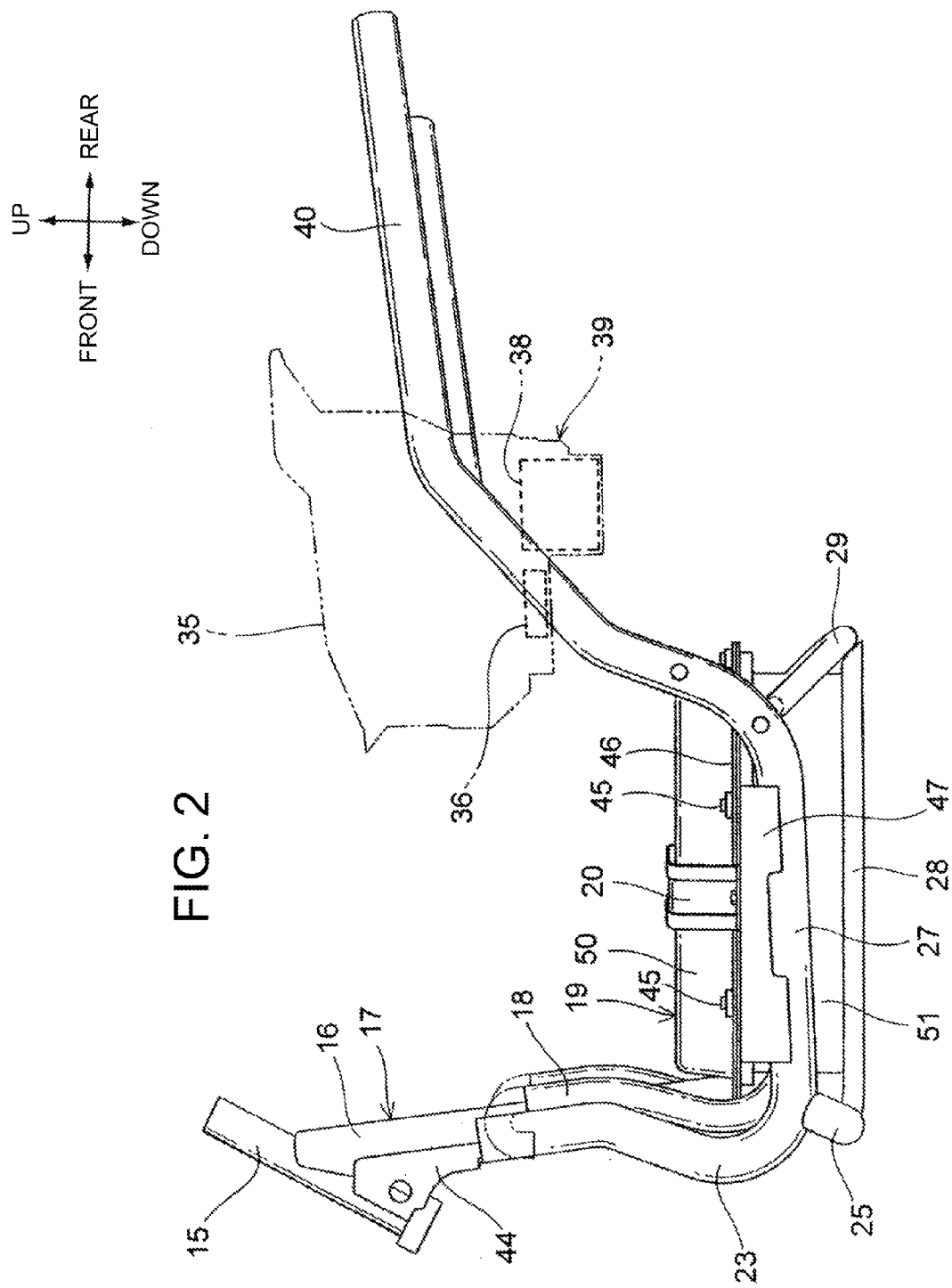
FIG. 2 is a side view of a body frame.
Figure 3:
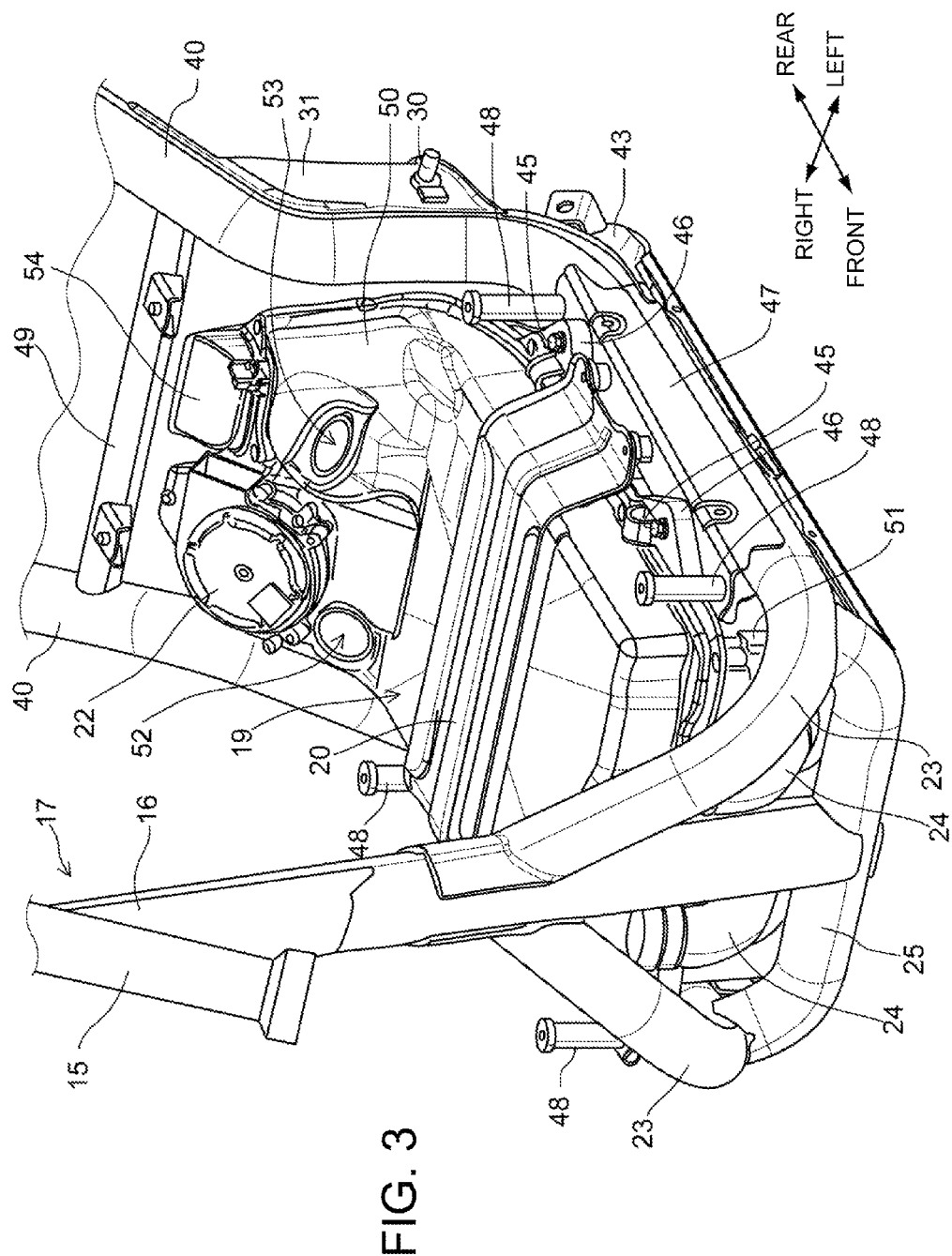
FIG. 3 is a perspective view of the body frame.

FIG. 1 is a left side view of an electric motorcycle 1 according to one embodiment of the present invention. FIG. 2 is a left side view of a body frame 17, and FIG. 3 is a perspective view of the body frame 17.

The electric motorcycle 1 is a scooter saddle-ride type electric vehicle having a low floor 21, and has a structure in which a rear wheel WR journaled to an axle 34 is rotatively driven by rotation power generated by an electric motor M incorporated into a swing arm 33.

The body frame 17 of the electric motorcycle 1 includes a head pipe 15 that steerably supports a front fork 2, which journals a front wheel WF, and a rodlike steering handlebar 9 coupled to the upper part of the front fork 2, and tilts upward and rearward; a main frame 16 that extends rearward and downward from the head pipe 15; left and right under frames 27 coupled to the lower part of the main frame 16 via a curved portion 23, and extending rearward; and left and right rear frames 40 that are integrally continuous with the rear ends of the under frames 27 to extend upward and rearward.

The head pipe 15 turnably journals a steering stem 14, and the steering handlebar 9 is fixed on the upper end of the steering stem 14. On the other hand, an under bracket 12 supporting the upper end of the front fork 2 is fixed to the lower end of the steering stem 14.

The front part of the swing arm 33 is swingably supported on a pivot plate 31 provided to each of the rear frames 40 of the body frame 17 through a pivot shaft 30. A rear cushion unit 43 is provided between a rear part of the left rear frame 40 and a rear part of the swing arm 33. The swing arm 33 is a cantilever arm that journals the rear wheel WR only by the arm on the left side in a vehicle width direction, and a PDU (Power Drive Unit) 32 that controls output of the electric motor M is provided on the position in front of the cantilever arm and just behind the pivot shaft 30.

The electric motorcycle 1 includes a front cover 7 that covers the head pipe 15 from front, a leg shield 10 that is continuous with the front cover 7 from the rear of the head pipe 15 so as to cover legs of an occupant sitting on a seat 37, and the low floor 21 that is continuous with a lower part of the leg shield 10 in order that the occupant sitting on the seat 37 puts his/her legs thereon, and that covers a battery case 19 from above. The periphery of the battery case 19 and the periphery of the rear frame 40 are covered by a cowling made of resin or the like.

A headlight 4 is supported at a front end of the front cover 7 by a front stay 11 fixed to the head pipe 15, while a taillight 42 is mounted to the rear end of the rear frame 40. A horn 13 is mounted at the rear of the headlight 4, and a front fender 3 supported by the front fork 2 is mounted below the horn.

The center of the steering handlebar 9 in the vehicle width direction is covered by a handlebar cover 8, and a front carrier 6 is supported by the front stay 11 in front of the front cover 7. A basket 6a or the like that can accommodate baggage can be mounted to the front carrier 6. A rear carrier 41 is mounted above the rear frame 40.

The battery case 19 that accommodates a high-voltage (e.g., 69 V) battery module 61 for supplying power to the electric motor M is provided between the left and right under frames 27. A battery unit 60 is configured by storing the battery module 61 into the battery case 19. A guard plate 20 spanning across the battery case 19 in the vehicle width direction is provided between the left and right under frames 27 in order to prevent the battery case 19 from being affected by a load applied to the low floor 21.

A front protection member 25 that is coupled to the lower end of the main frame 16 for protecting the lower part of the front of the battery case 19 is provided to the front part of both the under frames 27. A rear protection member 29 that protects the lower part of the rear of the battery case 19 is provided to the rear part of both the under frames 27, and plural lower protection members 28 that extend in a longitudinal direction of the body to protect the battery case 19 from below are provided between the front protection member 25 and the rear protection member 29.

A downstream end of left and right cooling air introducing ducts 18 is connected to the front of the battery case 19 via a connection pipe 24. The cooling air introducing ducts 18 extend along the main frame 16 so as to sandwich the main frame 16 from both sides in the leg shield 10. The upper end of the cooling air introducing duct 18 is connected to an air intake port formed in the leg shield 10.

A cooling fan 22 for sucking out air in the battery case 19 is provided on the top surface at the rear part of the battery case 19. By the operation of the cooling fan 22, air is positively introduced from the cooling air introducing duct 18, so that the battery module 61 in the battery case 19 is cooled.

A synthetic resin accommodating box 35 arranged below the seat 37 and above the swing arm 33 is located between the left and right rear frames 40 so as to be supported by both the rear frames 40. The accommodating box 35 is covered by an openable and closable seat 37 from above. An accommodation recessed part 39 for accommodating a low-voltage battery (e.g., 12 V) that supplies power to accessories such as the headlight 4 and the taillight 42 is integrally formed at the rear lower part of the accommodating box 35 so as to project downward. A fuse box 36 is provided in front of the low-voltage battery 38.

Referring to FIGS. 2 and 3, the battery case 19 made of hard synthetic resin or the like is configured by a bottomed box-like casing body 51, and the cover member 50 covering an upper opening of the casing body 51. A flange 46 protruding in the vehicle width direction is formed around a joint surface between the casing body 51 and the cover member 50. A side bracket 47 is fixed by welding on the top surfaces of both the under frames 27, and the guard plate 20 and the flange 46 of the battery case 19 are fixed on the side bracket 47. The flange 46 having a shape of avoiding the guard plate 20 is fixed on the top surface of the side bracket 47 by a bolt 45.

Columnar posts 48 for supporting the low floor 21 on four points are mounted on the top surfaces at the front ends and the rear ends of both the side brackets 47. The left and right rear frames 40 are coupled by a connection pipe 49, directing in the vehicle width direction, at the upper and rear part of the battery case 19. The battery case 19 is formed with a rising portion toward the rear of the body along the shape of the rear frame 40, and the cooling fan 22 is mounted on the rising portion. Holes 52 and 53 for drawing a high-voltage harness and a signal harness, which extend to the outside from the battery case 19, are formed near the cooling fan 22.

Figure 5:
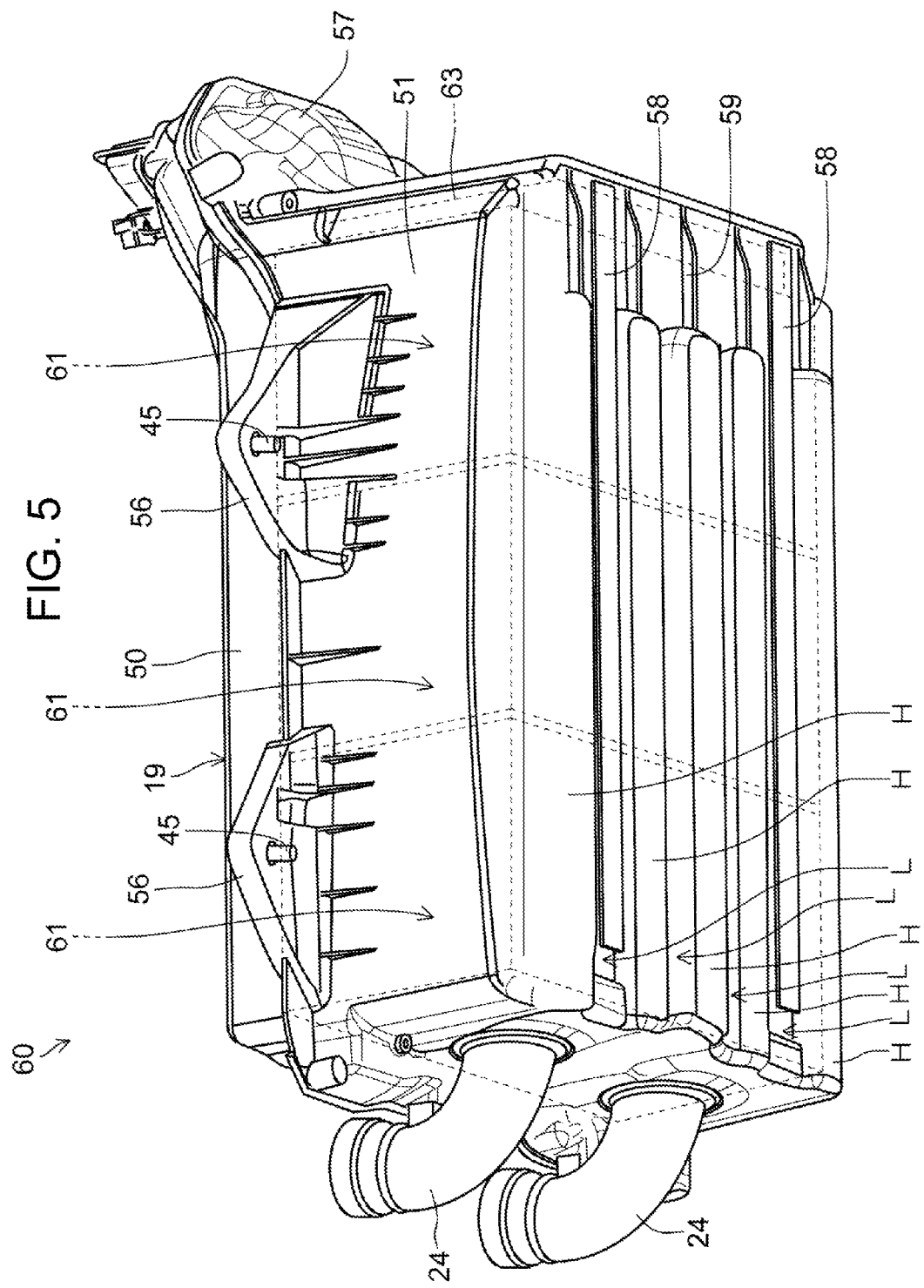
FIG. 5 is a perspective view of the battery unit viewed from the underside of a body.

FIG. 4 is a left side view of the battery unit 60. FIG. 5 is a perspective view of the battery unit 60 viewed from bottom of the body. Components the same as or equivalent to those described above are identified by the same reference signs. As described above, the left and right connection pipes 24 are mounted on the side end of the casing body 51 of the battery case 19 on the front of the body. An expansion portion 57 into which a contactor unit 64 is stored is mounted on the casing body 51 at the rear of the body.

Three sets of battery modules 61 are accommodated in the battery case 19. The battery unit 60 is composed of the battery case 19, the battery module 61 formed by stacking plural battery cells, and peripheral components thereof. A battery management unit (BMU) 63 is mounted between the battery module 61 near the rear of the body and the contactor unit 64, and a voltage/thermal monitoring (VTM) board 62 is mounted on the upper part of each battery module 61. The battery management unit 63 transmits information on the voltage, temperature and so on of the battery, collected by the voltage/thermal monitoring board 62 to the PDU 32 (see FIG. 1) by way of CAN communication or the like.

The battery cells composing the battery module 61 are connected in series, and three battery modules 61 are connected in parallel. The battery module 61, a plate-like member enclosing the battery module 61 from four directions, and the voltage/thermal monitoring board 62 are adjacently arranged in the battery case 19 in the same direction. A drainage hole 55 to which a cock is provided is formed in the front lower part of the casing body 51.

Referring to FIG. 5, the bottom surface of the casing body 51 has an uneven shape including crest portions H and valley portions L, which are directed in the longitudinal direction of the body, and which are alternately arranged in the vehicle width direction. A reinforcement rib 59 rising from the bottom surface of the casing body 51 is formed on each crest portion H at the rear of the body. The drawing shows that a rubber member 58 is attached on the upper surface of the lower protection member 28 (see FIG. 1) of the body frame for preventing interference with the battery case 19 is provided on the valley portion L positioned outside in the vehicle width direction.

Figure 6:
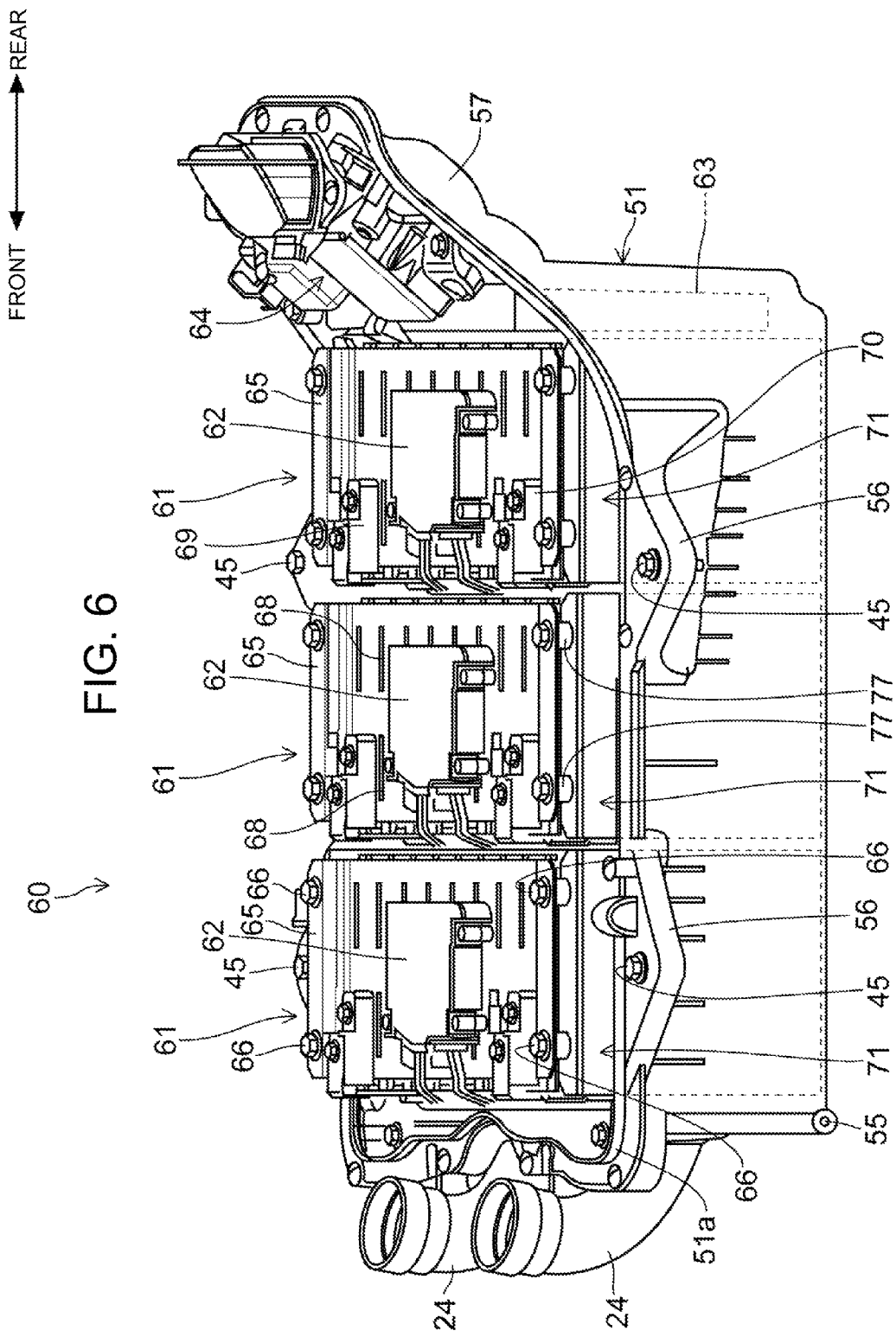
FIG. 6 is a perspective view illustrating a state in which a cover member of a battery case is removed.
Figure 7:
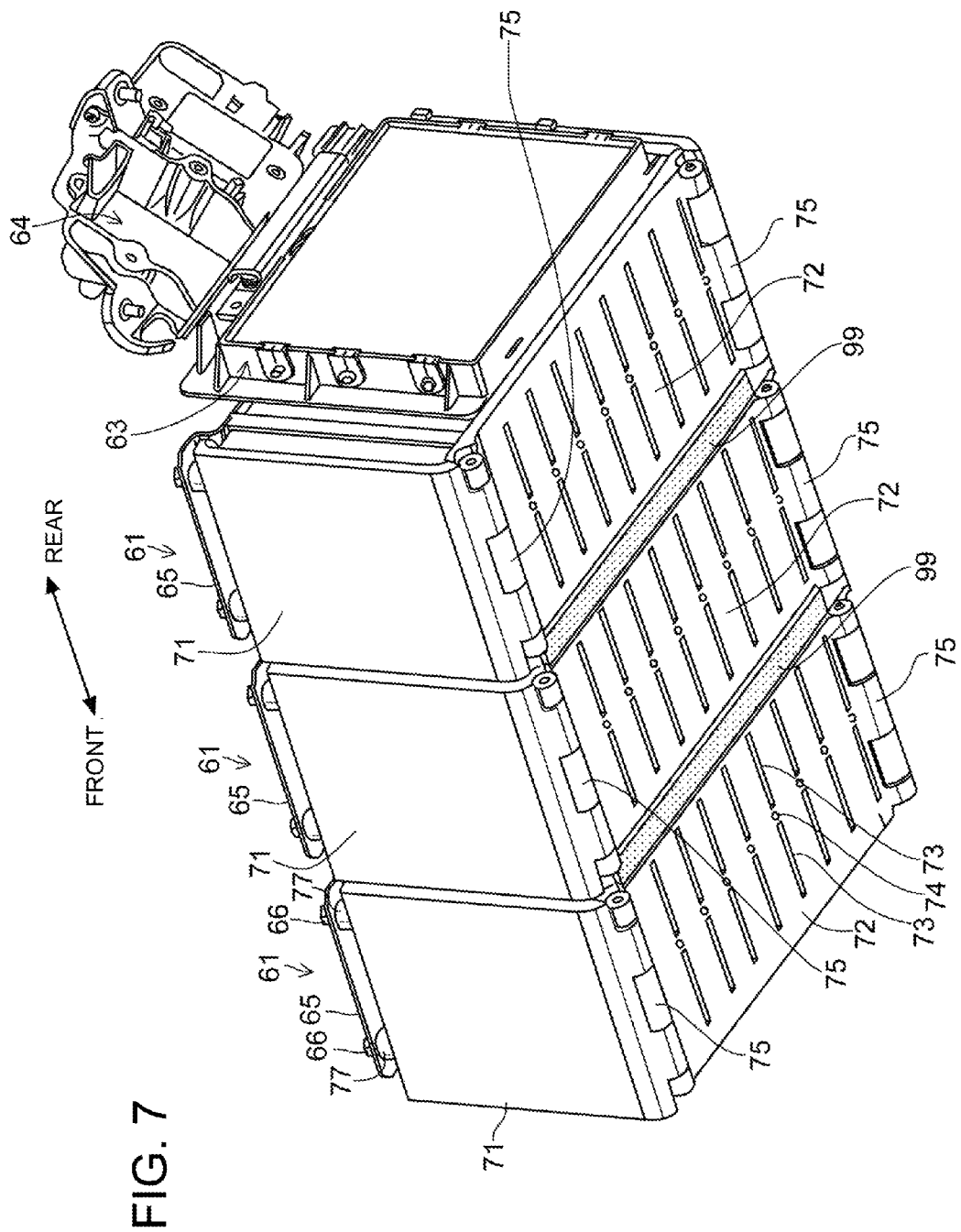
FIG. 7 is a perspective view of all units accommodated in the battery case.
Figure 8:
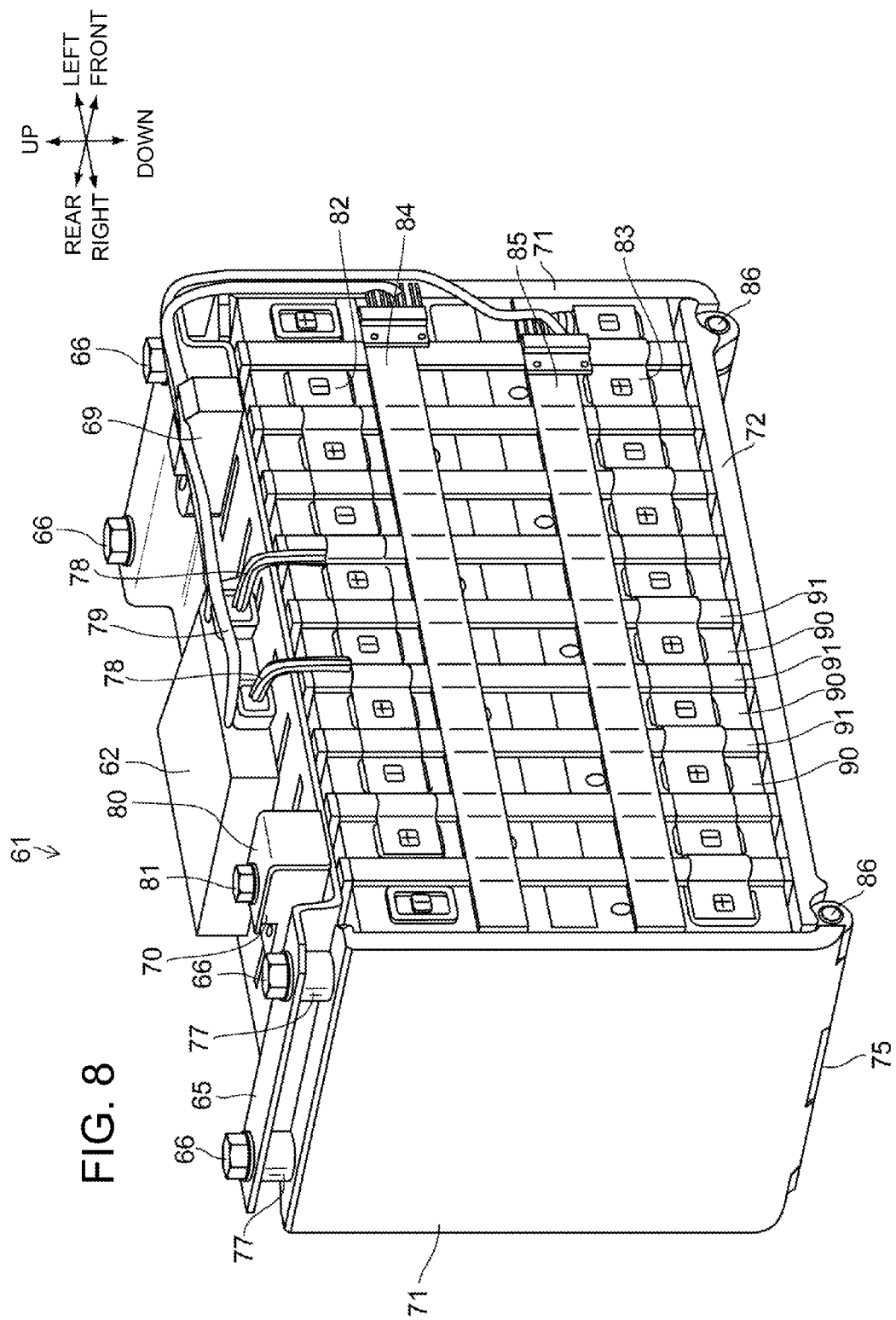
FIG. 8 is a perspective view of a battery module.

FIG. 6 is a perspective view illustrating the state in which the cover member 50 of the battery case 19 is removed. FIG. 7 is a perspective view illustrating all units accommodated in the battery case 19, and FIG. 8 is a perspective view of the battery module 61. The cover member 50 is fixed to the casing body 51 with plural fastening screws (not illustrated). A rib 51a exhibiting a sealing function is formed on a joint portion between the casing body 51 and the cover member 50 along an outer edge shape of the cover member 50.

As described above, the three battery modules 61 are arranged proximate to one another in the longitudinal direction of the body, and a sponge member 99 is provided between the battery modules 61. The sponge member 99 has a function of preventing the transmission of vibration among the battery modules 61, and a function of preventing outside air introduced from the cooling air introducing duct 18 (see FIGS. 1 and 2) from flowing between the battery modules 61.

Referring to FIG. 8, the battery module 61 has the structure that the battery cells 90 and separators 91 are alternately stacked, and in the present embodiment, ten battery cells 90 and nine separators 91 are stacked in the vehicle width direction (lateral direction in the figure) to form the battery module 61.

Two opposing surfaces of the battery module 61 in the vehicle width direction and twelve opposing surfaces in the vertical direction of the body are enclosed by a plate-like member preventing an expansion of each battery cell 90 due to the secular change. The plate-like member includes a lower plate 72 that is in contact with the lower surface of the battery module 61, left and right side plates 71 coupled to both ends of the lower plate 72 in the vehicle width direction, and an upper plate 65 that links and fixes the upper ends of both side plates 71. One end of the lower plate 72 and one end of the side plate 71 are swingably coupled through a hinge mechanism 75 having a rotating shaft 86, and the other end of the side plate 71 and the upper plate 65 are fixed by use of a fastening bolt 66 serving as a fastening member.

With this structure, the battery module 61 can be held with the state in which the battery module 61 is tightened from the vehicle width direction, i.e., pressure is applied in the stacking direction of the battery cell 90, according to setting of a distance between the upper ends of both the side plates 71. Thus, even if each battery cell 90 tends to expand, it is possible to prevent the increase in the size of the battery module 61 in the vehicle width direction and prevent the positional misalignment between the battery cells 90.

In the present embodiment, two cylindrical bosses 77 formed with a screw hole are mounted on the upper end of the upper plate 65, and when the fastening bolt 66 through a through-hole (not illustrated) formed in the upper plate 65 is fastened to the cylindrical boss 77 with pressure applied from the outside of both the side plates 71, the battery module 61 is completely fastened and fixed. The pressure applied to the battery module 61 after the battery module is fastened and fixed is affected by the size of the battery module 61, the size between the left and right hinge mechanisms 75, the size between the through-holes in the upper plate 65 in the vehicle width direction, rigidity of each plate, and the like. In the present embodiment, the lower plate 72 and the side plates 71 are made of hard resin, and the upper plate 65 is made of a metal thin plate.

With the tightening structure of the battery module 61 described above, the projecting amount of the components forming the tightening structure toward the outer circumference direction of the battery module can be reduced, compared to a tightening structure in which both end faces of the battery module are sandwiched by a pair of plate-like members, and the plate-like members are tightened by use of a threaded connecting rod. Accordingly, the battery unit 60 can be downsized.

The voltage/thermal monitoring board 62 is mounted on the upper plate 65 at the center of the battery module 61 in the vehicle width direction, whereby the voltage/thermal monitoring board 62 can be mounted by effectively utilizing a space between steps formed on both ends of the upper plate 65. Note that the shape and structure of each plate can be changed. For example, the height of the cylindrical boss 77 formed on the side plate 71 may be reduced to lower the step formed on both ends of the upper plate 65, or the step may not be formed.

Electrodes of the respective battery cells 90 are connected by bus bars 82 and 83, whereby a positive electrode and a negative electrode are drawn from the battery cell 90 located on both ends of the battery module 61. Metal electrode plates serving as output terminals for extracting both the electrodes are fixed with screws to the upper surfaces of resin seats 69 and 70 that are fixed on the upper surface of the upper plate 65. FIG. 8 illustrates the state in which the electrode plate 80 for extracting the negative electrode is fixed to the upper surface of the seat 70 with a screw 81.

Voltage detection boards 84 and 85 for collecting information on voltage of each battery cell 90 are provided between the bus bars 82 and 83. The voltage information collected by the voltage detection boards 84 and 85 is inputted to the voltage/thermal monitoring board 62 through a harness 79. Information on temperature of each battery cell 90 is inputted to the voltage/thermal monitoring board 62 through wiring 78 coupled to a temperature sensor (not illustrated).

Plural upper penetration slits 68 directing toward the longitudinal direction of the body are formed in the upper plate 65 (see FIG. 6). Plural lower penetration slits 73 directing toward the longitudinal direction of the body are formed in the lower plate 72 (see FIG. 7). The upper penetration slits 68 and the lower penetration slits 73 are formed to guide air sucked into the battery case 19 from the bottom up through each battery cell 90. Through-holes 74 formed adjacent to the lower penetration slits 73 on the lower plate 72 function as positioning holes for the separators 91. The details will be described later.

Figure 9:
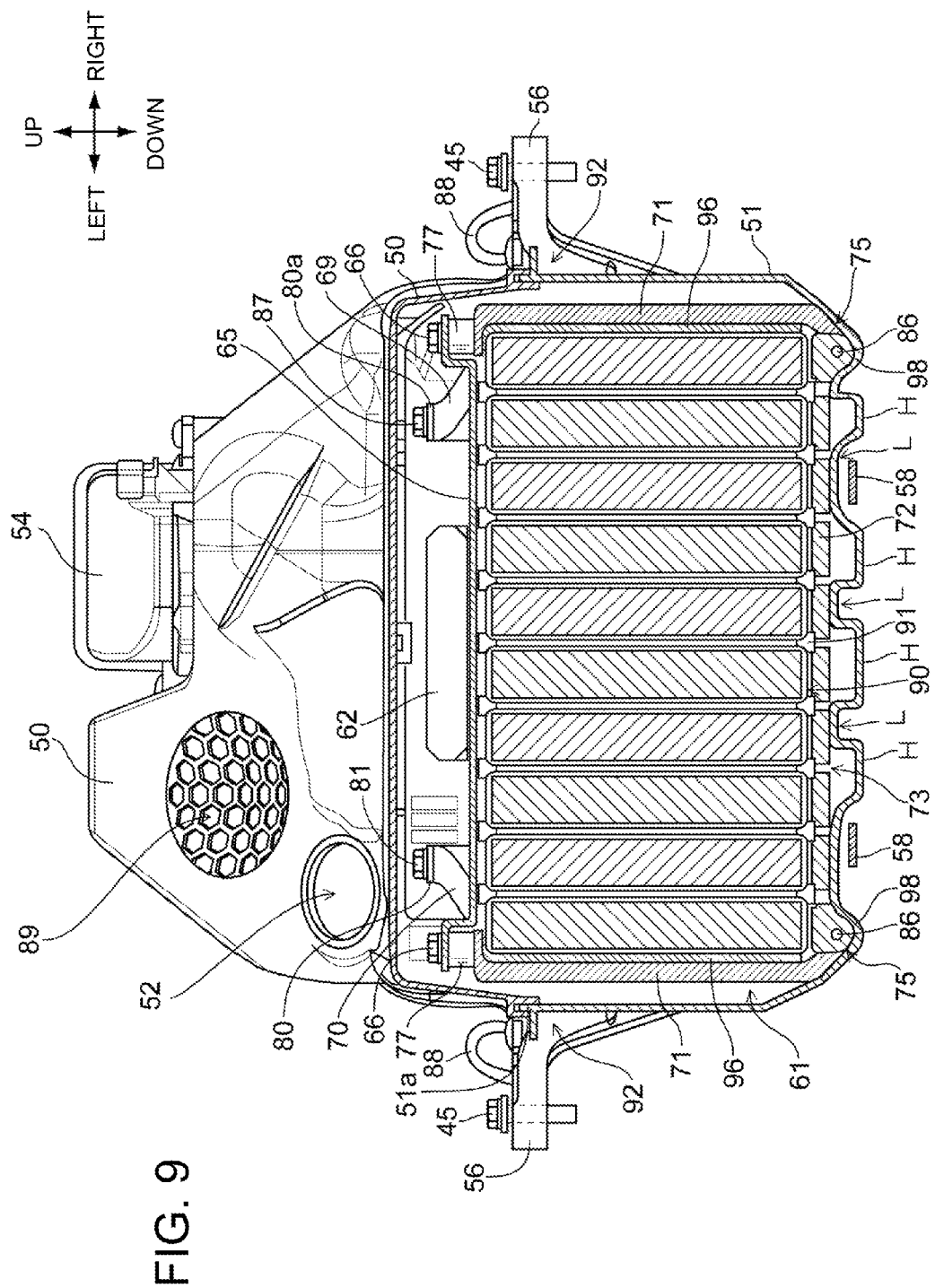
FIG. 9 is a sectional view taken along line A-A in FIG. 4.

FIG. 9 is a sectional view taken along line A-A. The separator 91 is arranged between each battery cell 90 as described above, and the separator 91 secures a predetermined gap between the battery cells 90. Air sucked into the battery case 19 is introduced from the slits 73 in the lower plate 72, led upward through the gap between the battery cells 90, and discharged to the outside from an exhaust port 89 through the cooling fan 22 (see FIG. 3).

The voltage/thermal monitoring board 62 and the seats 69 and 70 supporting the electrode plates 80 and 80*a* are mounted on the upper surface of the upper plate 65. This structure can realize an effective use of the space, and concentration of components, thereby being capable of downsizing the battery case 19. A joint portion 92 between the cover member 50 and the casing body 51 has a sealing structure in which the rib 51*a* (see FIG. 6) formed in the casing body 51 is engaged with a groove formed on the cover member 50. A ring member 88, through which various wirings pass, is mounted on the top surface of the flange 56. The screw 87 is mounted to the seat 69 for the positive electrode, while the screw 81 is mounted to the seat 70 for the negative electrode.

In battery module 71 according to the present embodiment, an increase in the size in the vehicle width direction caused by application of the tightening structure corresponds only to the thickness of both the side plates 71. On the other hand, the size in the vertical direction corresponds to the size with the thickness of the lower plate 72 and the height of the mounting portion of the fastening bolt 66 added. However, the voltage/thermal monitoring board 62 and the electrode seats 69 and 70 are secured on the upper face of the upper plate 65, so that the space is effectively utilized.

Note that the hinge mechanism 75 that can swing the side plate 71 projects downward from the bottom surface of the lower plate 72. A projecting portion 98 in which the projection portion of the hinge mechanism 75 is fitted is formed on the bottom of the casing body 51. An insulation sheet 96 made of a thin rubber or the like is formed between the battery cell 90 located at the end in the stacking direction and the side plate 71.

Figure 10:
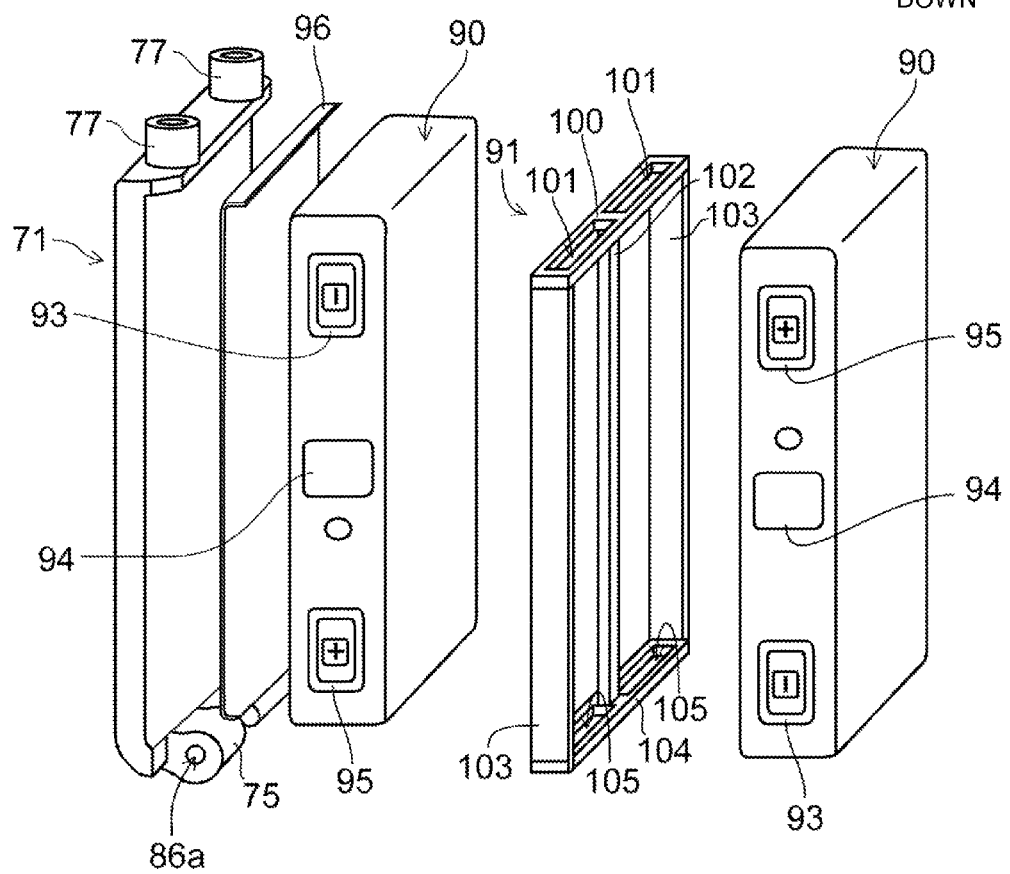
FIG. 10 is a perspective view illustrating a structure of the battery module.
Figure 11:
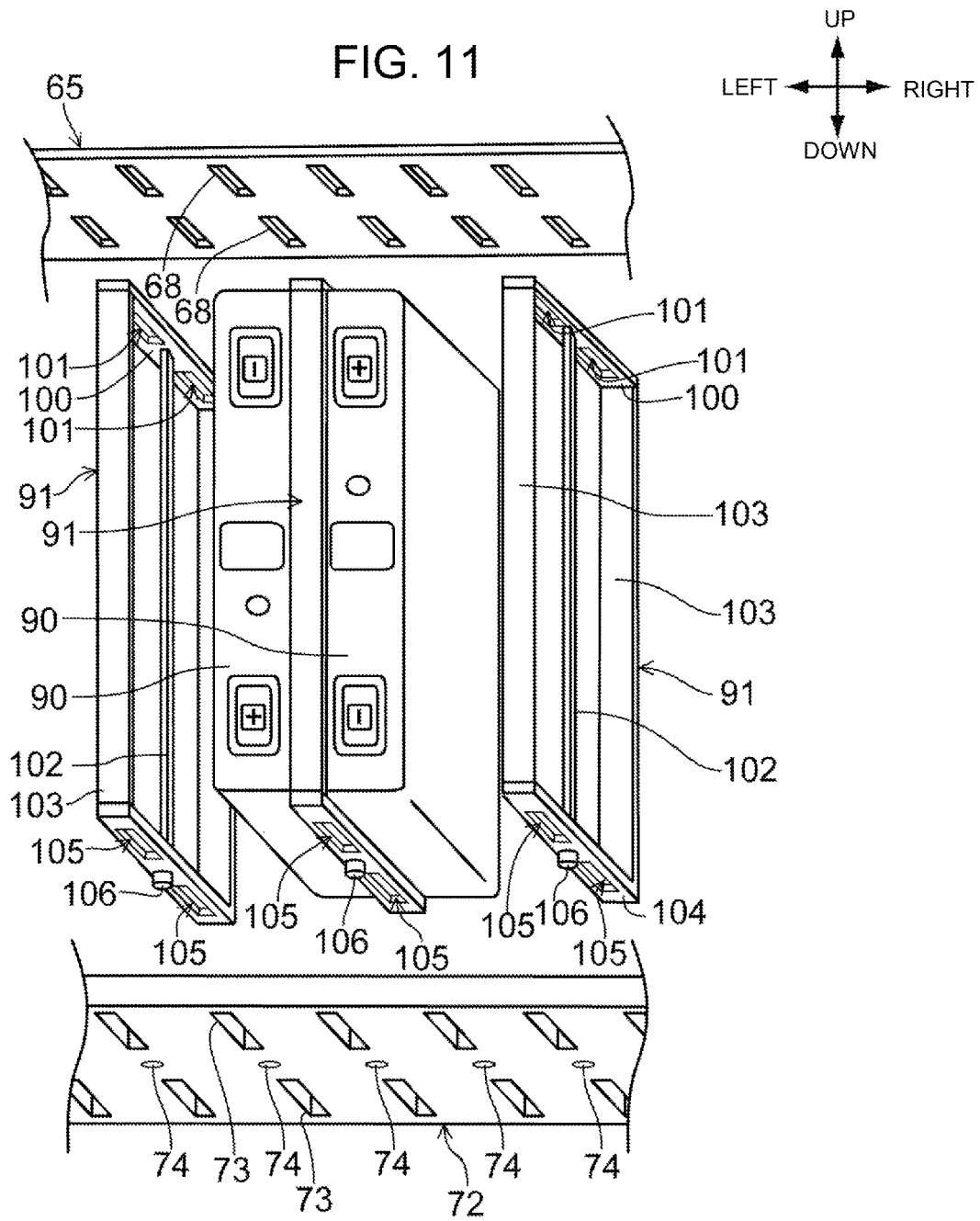
FIG. 11 is a perspective view illustrating an engagement structure between the battery module, and an upper plate and a lower plate.

FIG. 10 is a perspective view illustrating the structure of the battery module 61. FIG. 11 is a perspective view illustrating an engagement structure of the battery module 61 with the upper plate 65 and the lower plate 72. The rectangular battery cell 90 is a plate-like member with a certain thickness formed such that a sheet-like battery element is covered by a package made of resin or the like, and the negative electrode 93 and the positive electrode 95 are formed thereon. When the battery module 61 is configured, the adjacent battery cells 90 are arranged inversely in the vertical direction in order to establish the serial connection by use of the bus bars 82 and 83. An explosion-proof window 94 that is opened when the internal pressure exceeds a predetermined value is formed at the center of one surface of the battery cell 90 at the front of the body in the vertical direction.

The separator 91 made of resin such as plastic is formed such that a frame is formed by coupling a top plate 100 and a bottom plate 104 by a pair of side plates 103, and a partition bar 102 is provided on the center of the frame. Two top penetration slits 101 are formed in the top plate 100 as avoiding the partition bar 102, while two bottom penetration slits 105 are formed in the bottom plate 104 as avoiding the partition bar 102.

With this structure, when the battery cell 90 and the separator 91 are engaged with each other, the battery cell 90 is inserted into the frame until the side face thereof abuts on the partition bar 102, and located on a predetermined position with a gap secured between the battery cells 90 by the thickness of the partition bar 102. Further, a positioning projection 106 is formed on the bottom surface of the bottom plate 104 under the partition bar 102. Since the positioning projection 106 is engaged with the through-hole 74 in the lower plate 72, the position of each separator 91 is determined.

Thus, the positional alignment between the lower penetration slit 73 in the lower plate 72 and the bottom penetration slit 105 in the separator 91 is made, and the positional alignment between the upper penetration slit 68 in the upper plate 65 and the top penetration slit 101 in the separator 91 is made, whereby a cooling air passage is formed. Since the gap between the battery cells 90 is specified by the partition bar 102, the passage is not closed even when the battery module 61 is tightened by both the side plates 71 or when each battery cell 90 slightly expands, resulting in that satisfactory cooling can be continued.

The engagement relationship between the positioning projection 106 and the through-hole 74 can be set to be capable of allowing a slight positional deviation of the separator 91 in the vehicle width direction upon applying pressure to the lower plate 72.

Figure 12:
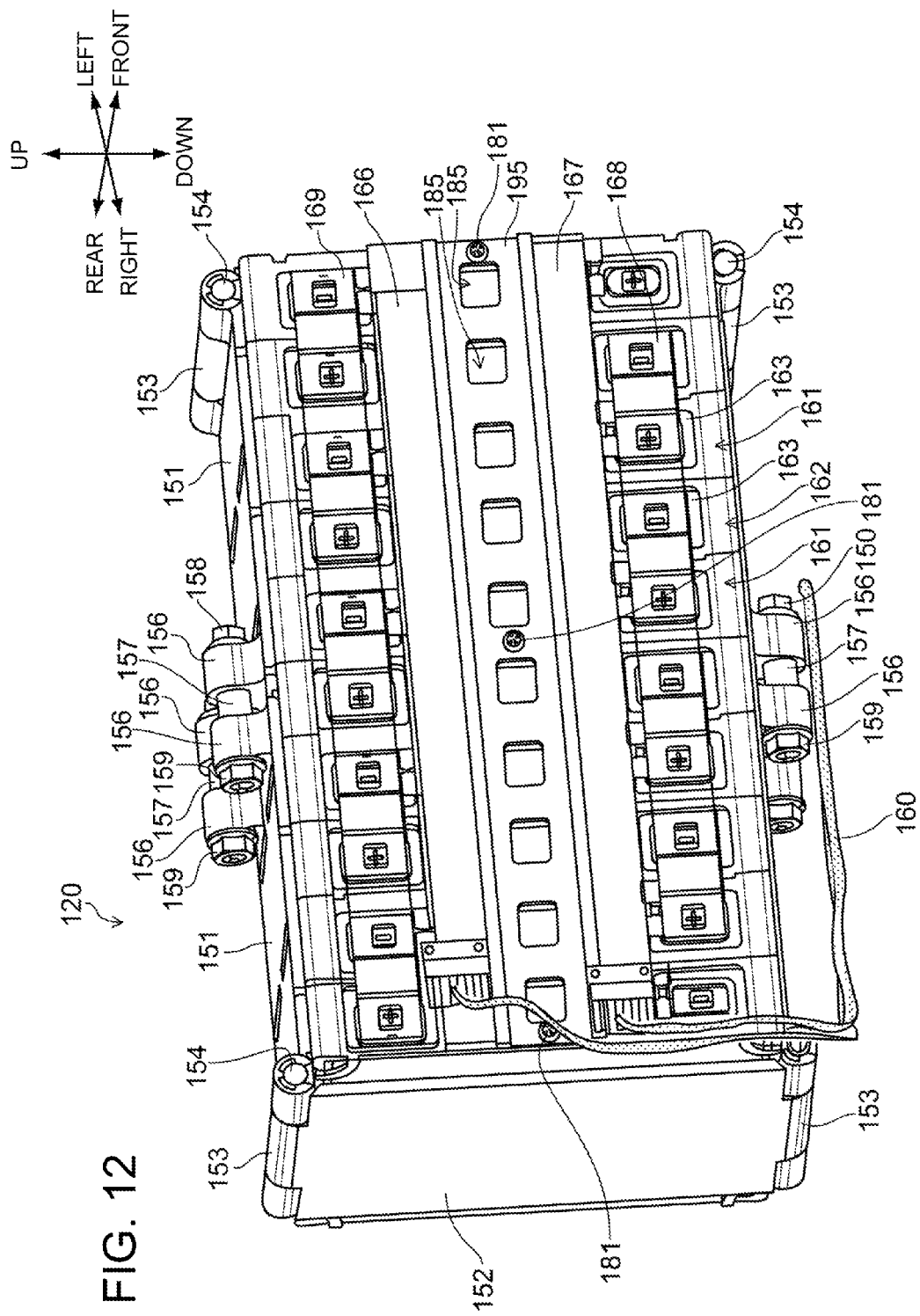
FIG. 12 is a perspective view illustrating a battery module according to a second embodiment of the present invention.
Figure 13:
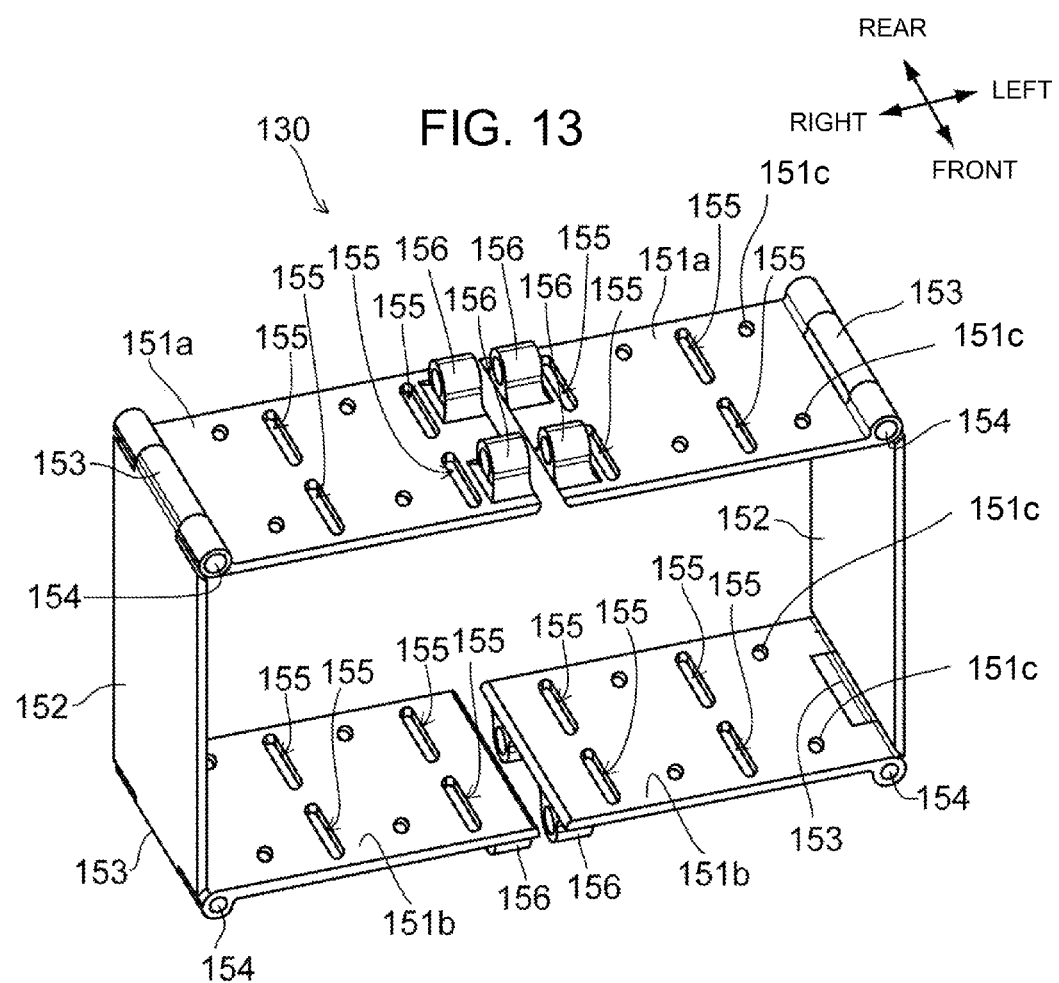
FIG. 13 is a perspective view illustrating only a tightening structure of the battery module.
Figure 14:
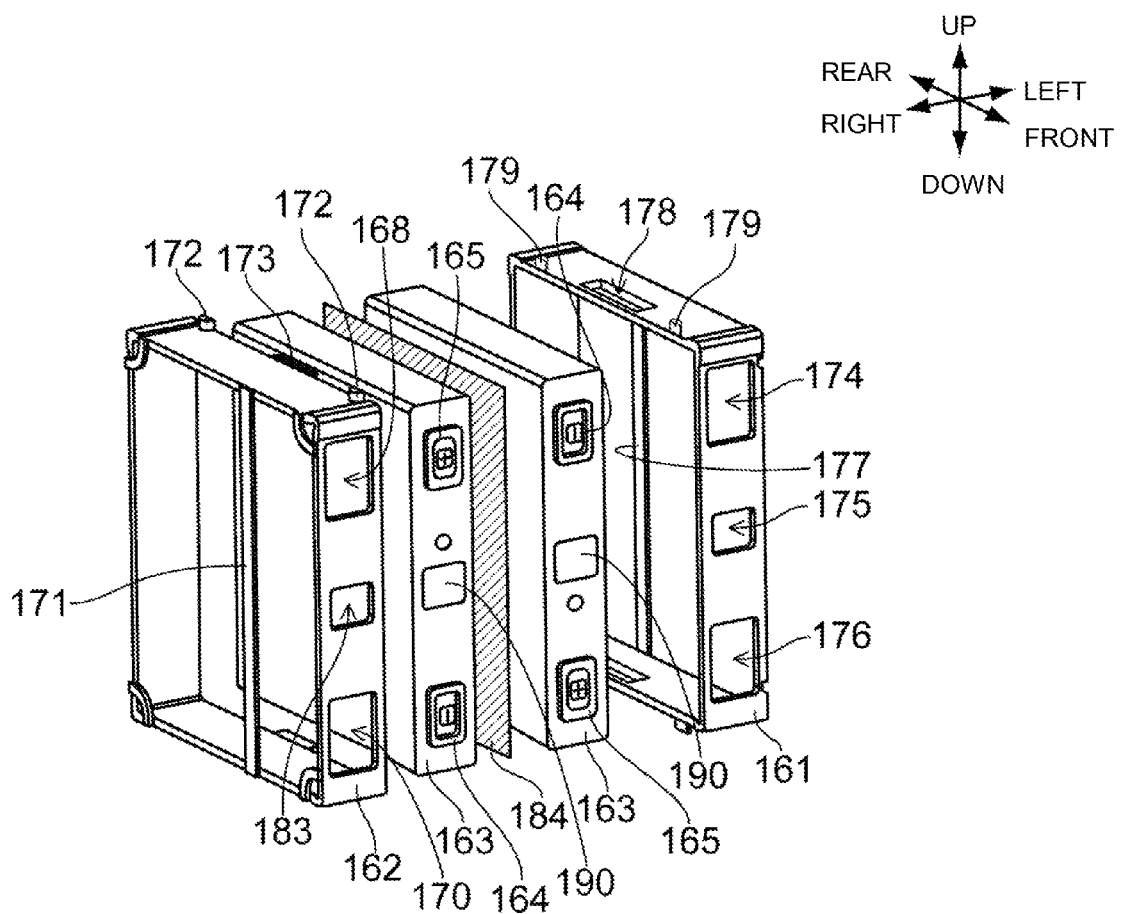
FIG. 14 is an exploded perspective view of the battery module.
Figure 15:
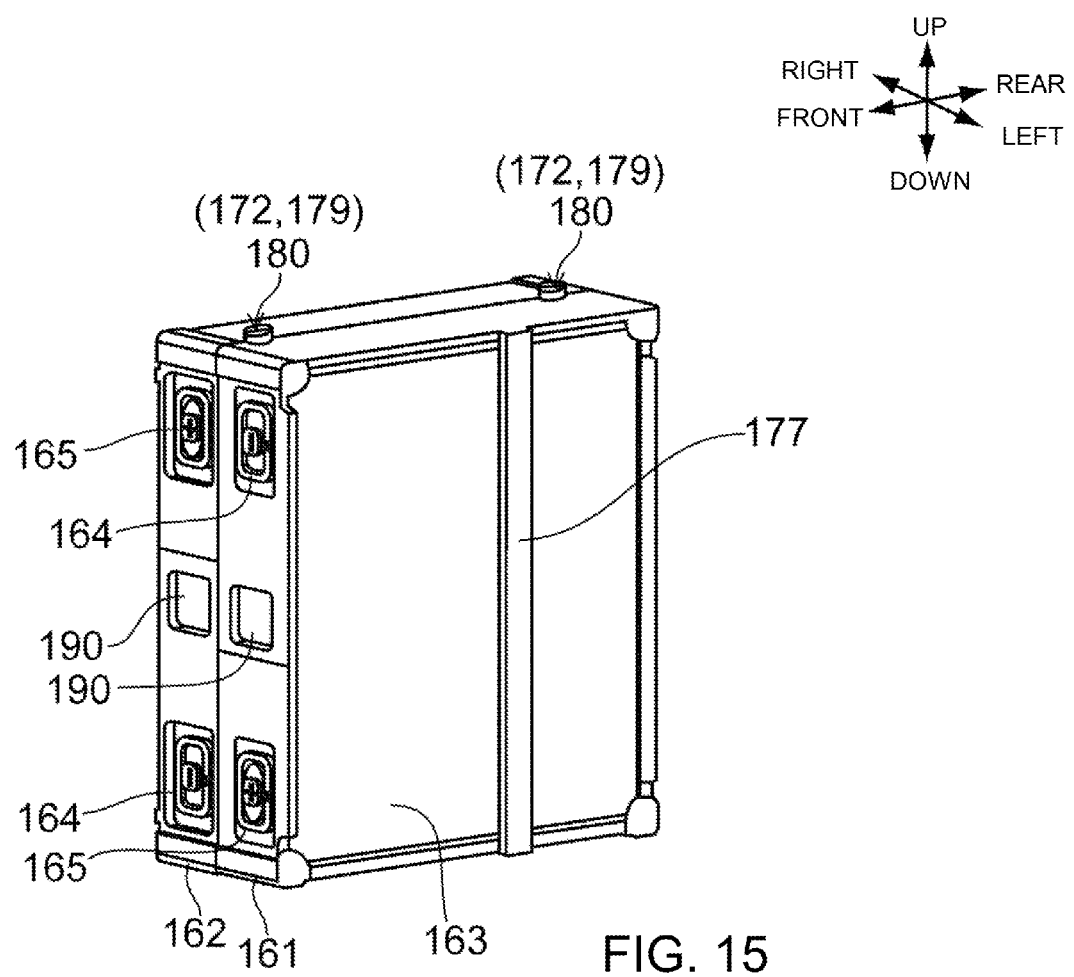
FIG. 15 is a perspective view of the battery module.

FIG. 12 is a perspective view of a battery module 120 according to a second embodiment of the present invention. FIG. 13 is a perspective view illustrating only a tightening structure 130 of the battery module 120. Further, FIG. 14 is an exploded perspective view of the battery module 120, and FIG. 15 is a perspective view of the battery module 120.

The battery module 120 according to the present embodiment is characterized in that, in order to tighten the battery module 120 in the stacking direction of battery cells 163, a hinge structure 153 having a rotating shaft 154 is provided on four positions, i.e., the fastening portion is provided on two upper and lower positions of the battery module 120.

Referring to FIG. 13, the tightening structure 130 includes left and right upper plates 151a, left and right side plates 152, and left and right lower plates 151b. In the present embodiment, the upper plate 151a and the lower plate 151b are the same component, so that the tightening structure 130 is composed of two vertical plates and four lateral plates. The upper plate 151a and the lower plate 151b are respectively formed with four penetration slits 155.

The tightening structure 130 tightens and fixes the battery module 120 by swingably journaling the upper plate 151a on the upper end of the side plate 152 through the hinge mechanism 153, swingably journaling the lower plate 151b on the lower end of the side plate 152 through the hinge mechanism 153, sandwiching the battery module 120 in the vehicle width direction with the opposing structure having the same configuration, and fastening the opposing fastening bosses 156 with a fastening member.

Referring to FIGS. 14 and 15, two battery cells 163 are arranged to be adjacent to each other with an insulation sheet 184 made of thin rubber being interposed therebetween, and two battery cells 163 are covered by a left battery holder 161 and a right battery holder 162, whereby the battery module 120 is formed. In the present embodiment, five left battery holders 161 and five right battery holders 162 are used to form five battery modules 120, each including ten battery cells 163 in total.

The battery cell 163 has a structure in which a plate-like battery element is covered by a resin package, and a negative electrode 164 and a positive electrode 165 are provided. An explosion-proof window 190 that is opened when the internal pressure of the battery exceeds a predetermined value is formed at the center of one surface of the battery cell 163 in the vertical direction. The adjacent battery cells 163 are arranged inversely in the vertical direction in order to establish the serial connection by use of bus bars 168 and 169.

On the other hand, the left battery holder 162 is formed with electrode windows 168 and 170, and a communication window 175. When the battery cell 163 is engaged, the negative electrode 164 and the positive electrode 165 are exposed to the outside from the electrode windows 168 and 170 respectively, and the explosion-proof window 190 is exposed to the outside from the communication window 183. Electrode windows 174 and 176, and a communication window 175 on the right battery holder 161, have the same structure as those on the left battery holder 162.

Upper and lower engagement pawls 173 are formed on the left battery holder 162 at the position opposite to the right battery holder 161, and when the engagement pawls 173 are engaged with upper and lower engagement holes 178 formed on the right battery holder 161, both the battery holders 161 and 162 are fixed to each other. In this case, two semicolumnar pawls 172 formed on the left battery holder 162 and two semicolumnar pawls 179 formed on the right battery holder 161 are joined to form two columnar projections 180.

A stopper plate 177 mounted to the right battery holder 161 and a stopper plate 171 mounted to the left battery holder 162 are arranged so as to be offset in the longitudinal direction, so that a gap corresponding to only the thickness of the stopper plates 171 and 177 is formed between the battery cells 163, when the battery modules 120 are arranged to be adjacent to each other.

The columnar projections 180 formed by the semicolumnar pawls 172 and 179 on the battery holders 161 and 162 are engaged with the through-holes 151c formed in the upper plate 151a and the lower plate 151b, whereby the battery module 120 is positioned. In this case, the penetration slits 155 formed in the upper plate 151a and the lower plate 151b are positioned with the gaps formed by the stopper plates 171 and 177, whereby a passage of outside air introduced into the battery case 19 is secured.

Referring again to FIG. 12, the tightening process of the battery module 120 is made such that a cylindrical collar 157 is inserted into a boss 156, and a fastening nut 159 is fastened to a thread portion of a fastening bolt 158 inserted into the cylindrical collar 157. The tightening force of the battery module 120 can optionally be adjusted by changing the length of the cylindrical collar 157.

Voltage detection boards 166 and 167 for collecting information on voltage of each battery cell 163 are provided between the bus bars 168 and 169. The voltage information collected on the voltage detection boards 166 and 167 is inputted to a thermal/voltage monitoring board (not illustrated) through a harness 160. The voltage detection boards 166 and 167 are mounted to a mount base 195 on which plural cylindrical communication windows 185 are formed. The mount base 195 is fixed to the battery module 120 by three screws 181 and, in this case, the explosion-proof window 190 of the battery cell 163 is exposed to the outside from each of the cylindrical communication window 185 of the mount base 195.

Figure 16:
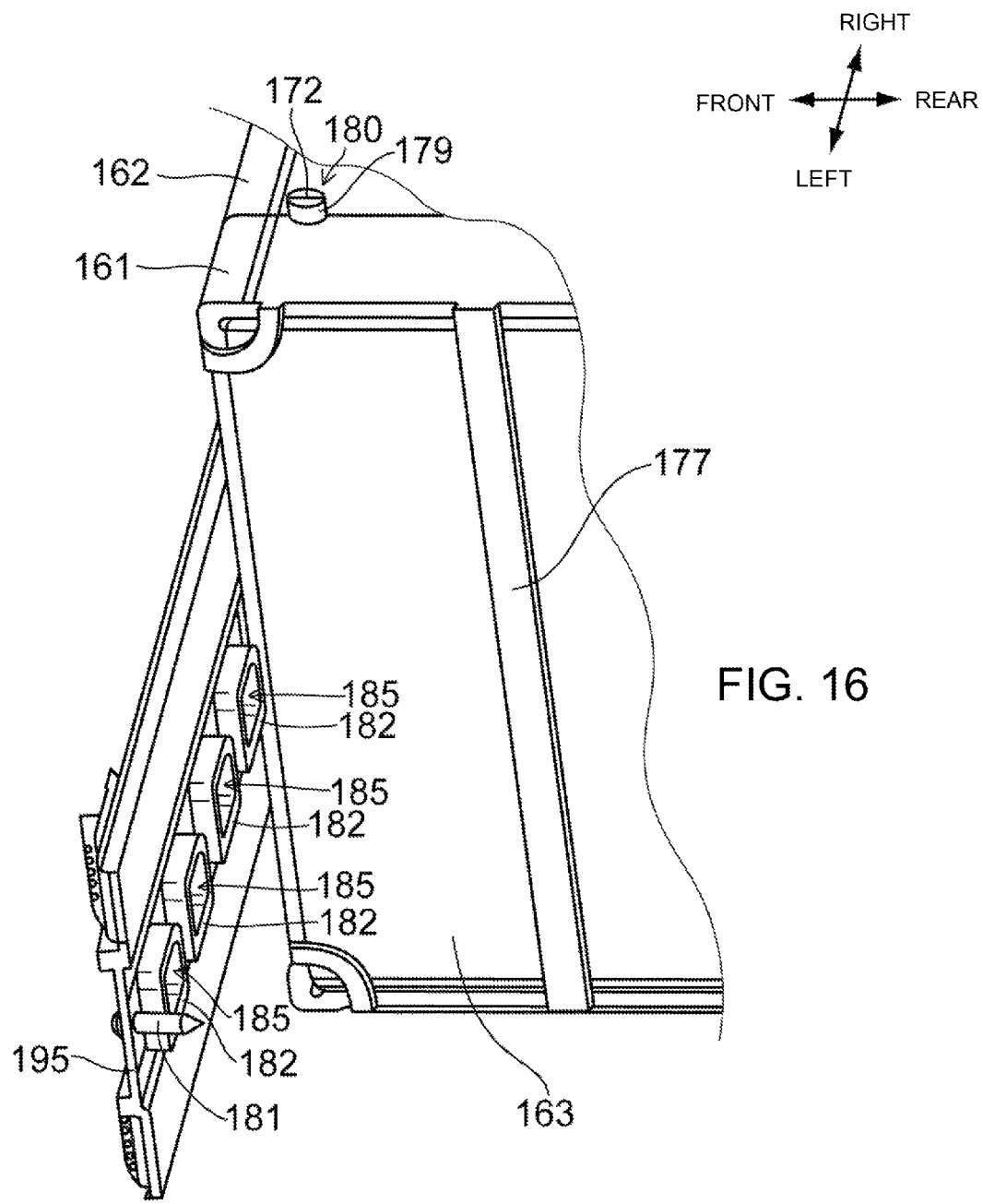
FIG. 16 is a perspective view illustrating a structure of a mount base.

FIG. 16 is a perspective view illustrating the structure of the mount base 195. Rising members 182 along the shapes of the corresponding cylindrical communication windows 185 are formed on the back surface of the mount base 195 supporting the voltage detection boards 166 and 167. When the mount base 195 is mounted to the battery module 120, each of the rising members 182 is inserted into each of the communication windows 175 and each of the communication windows 183 formed on the left and right battery holders 161 and 162 to position each battery holder, and further, the rising members 182 function as a guide for electrolytic solution when the explosion-proof windows 190 are opened.

The battery module according to the above-mentioned second embodiment includes the side plates (152, 152) arranged along two wall faces, opposing to each other in the stacking direction of the battery cells (163), of the wall faces of the battery module (120), the upper plates (151*a*) swingably supported to one end of the side plates (152, 152) by the hinge mechanism (153), and the lower plates (151*b*) swingably supported to the other end of the side plates (152, 152) by the hinge mechanism (153), wherein the upper plates (151*a*) are fastened by the fastening members (158, 159), and the lower plates (151*b*) are fastened by the fastening members (158, 159), in order to fix the battery module (120) with pressure being applied in the stacking direction of the battery cells (163). Since the center of the upper and lower divided plates is fixed by the fastening member such as a screw, the degree of tightening the battery cell can easily be adjusted, so that the adjustment during expansion due to the secular change can be facilitated.

The battery module (120) further includes the mount base (195) mounted on the battery module (120) and supporting the voltage detection boards (166, 167) that detects the voltage of the battery cell (163), wherein the rising member (182) forming the cylindrical communication window (185) formed on the mount base (195) is configured to be engaged with the communication windows (175, 183). Therefore, the explosion-proof window of the battery cell can be exposed to the outside, and further, the mount base can easily be positioned.

Figure 17:
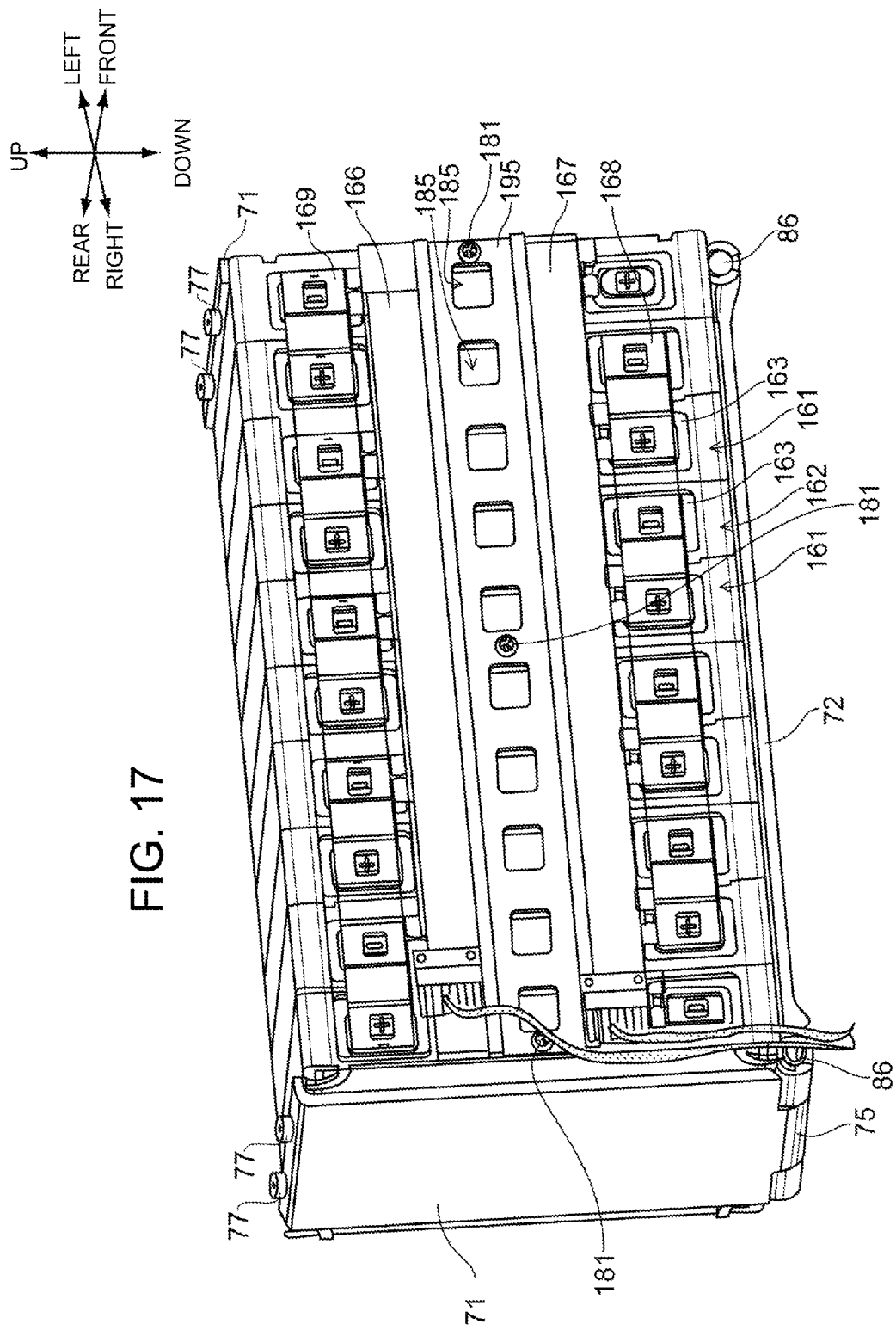
FIG. 17 is a perspective view illustrating a battery module according to a third embodiment of the present invention.
Figure 18:
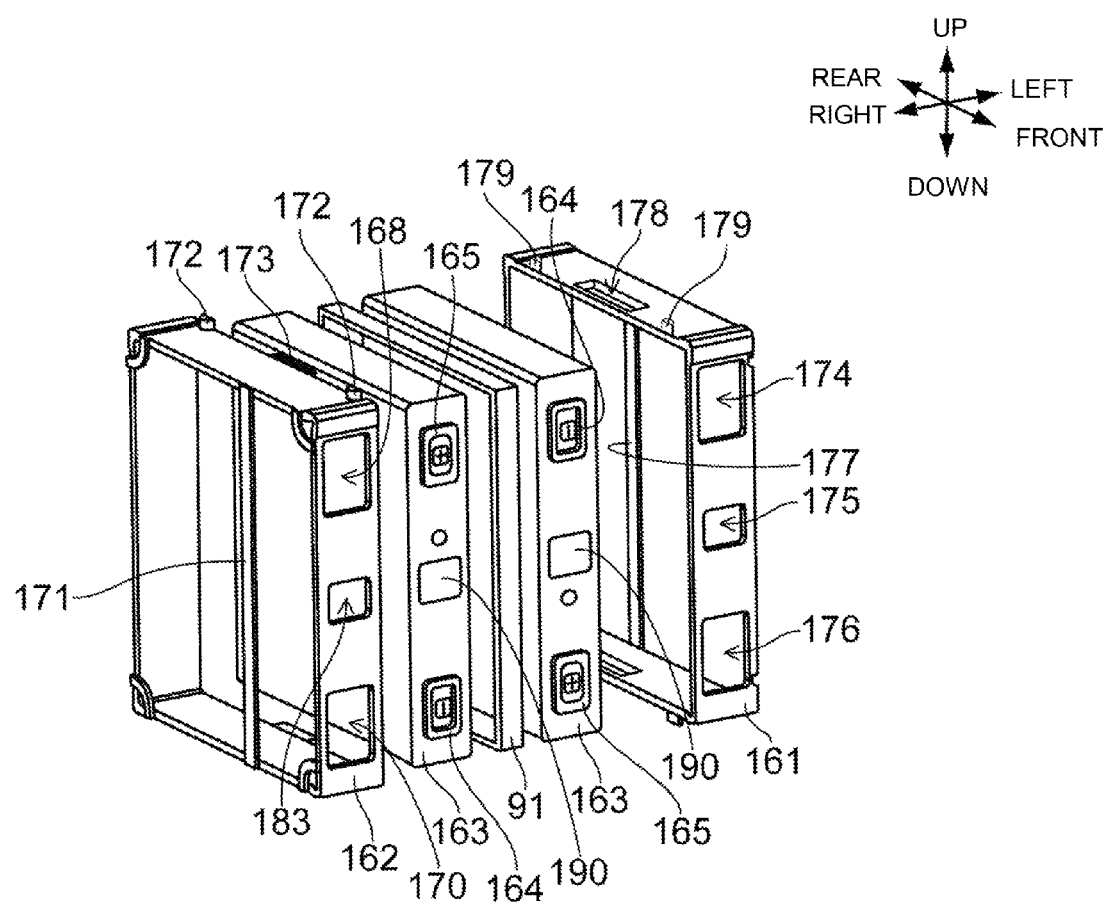
FIG. 18 is an exploded perspective view illustrating the battery module according to the third embodiment of the present invention.

FIG. 17 is a perspective view illustrating a battery module according to a third embodiment of the present invention. FIG. 18 is an exploded perspective view of the same. The third embodiment describes the case in which the battery module 120 described in the second embodiment is fixed with the plate used in the first embodiment. The same reference signs as described above identify the same or equivalent component. The plate described in the first embodiment has the structure in which, as illustrated in FIG. 8, the side plates 71 are mounted to both ends of the integral lower plate 72 through the hinge mechanism 75, and the upper plate 65 (not illustrated in FIG. 17) is mounted on the top end of both the side plates 71 via the fastening bolts 66. In the battery module 120 illustrated in the second embodiment, two battery cells 163 are arranged to be adjacent to each other across the separator 91 described in the first embodiment, instead of the insulation sheet 184 illustrated in FIG. 14, and the two battery cells 163 are covered by the left battery holder 161 and the right battery holder 162.

The shapes and structures of the battery cell and the battery module, and the shapes, structures and the like of the plates and fastening members for tightening the battery module are not limited to those described in the above-mentioned embodiments, and various modifications are possible. For example, the battery module composed of the left and right battery holders described in the second embodiment and the tightening structure with the hinge mechanisms on two positions described in the first embodiment can be combined to be used. The battery module according to the present invention can be applied not only to the electric motorcycle but also to various electric vehicles such as saddle-ride type three- and four-wheel vehicles.

REFERENCE SIGNS LIST

1 . . . Electric motorcycle
17 . . . Body frame
19 . . . Battery case
50 . . . Cover member
51 . . . Casing body
60 . . . Battery unit
61 . . . Battery module
65 . . . Upper plate
66 . . . Fastening bolt (fastening member)
68 . . . Upper penetration slit
71 . . . Side plate
72 . . . Lower plate
73 . . . Lower penetration slit
75 . . . Hinge mechanism
86 . . . Rotating shaft
90 . . . Battery cell
91 . . . Separator
93 . . . Negative electrode
94 . . . Explosion-proof window
95 . . . Positive electrode
96 . . . Insulation sheet
101 . . . Top penetration slit
102 . . . Partition bar
105 . . . Bottom penetration slit
120 . . . Battery module
151*a* . . . Upper plate
151*b* . . . Lower plate
152 . . . Side plate
161, 162 . . . Battery holder
163 . . . Battery cell

What is claimed is:

1. A battery module assembly comprising:
a battery module having a shape of a generally rectangular solid and formed by stacking plural rectangular battery cells;
at least four plates covering the battery module from four directions, the plates including:
a pair of side plates arranged along two side wall faces, opposing to each other in a stacking direction of the battery cells, of the battery module;
a lower plate that swingably supports one end of the pair of side plates by a pair of hinge mechanisms located on corners of the battery module and that is arranged along a lower wall face of the battery module; and
an upper plate that is arranged along an upper wall face of the battery module so as to be opposite to the lower plate, and that connects the other ends of the pair of side plates to each other, wherein
the side plates and the upper plate are tightened and fixed by use of a fastening member with pressure being applied in the stacking direction of the battery cells in order to fix the battery module, wherein
a seat for supporting an electrode plate serving as an output terminal of the battery module is arranged on a surface of the upper plate,
wherein the battery module has a structure in which the battery cells and separators, which are arranged to secure a predetermined gap between the battery cells, are alternately stacked, each separator defining a frame adapted to receive therein adjacent battery cells,
wherein the adjacent battery cells inserted into the separator together with the separator form a cooling air passage,
wherein each of the separators includes a top plate and a bottom plate coupled to the top plate by a pair of side separator plates, and a partition bar spaced from each of the side separator plates and spanning between the top and bottom plates, the separators are formed with positioning projections received in positioning holes formed respectively in the upper plate and the lower plate.

2. The battery module assembly according to claim 1, wherein the upper plate and the lower plate are respectively formed with penetration slits for passing cooling air flowing between the battery cells.

3. The battery module assembly according to claim 2, wherein the separators are formed with cooling air slits provided in a position corresponding to the respective penetration slits in the upper plate and the lower plate, and the positioning projections are aligned with the partition bars of the separators.

4. The battery module assembly according to claim 3, wherein a voltage/thermal monitoring board for monitoring voltage of the battery cells is mounted on the surface of the upper plate.

5. The battery module assembly according to claim 2, wherein a voltage/thermal monitoring board for monitoring voltage of the battery cells is mounted on the surface of the upper plate.

6. The battery module assembly according to claim 2, wherein the fastening member is a fastening screw that penetrates the upper plate to be threaded to the other end of one of the side plates.

7. The battery module assembly according to claim 2, wherein an insulation sheet is provided between one of the side plates and the battery module.

8. The battery module assembly according to claim 1, wherein a voltage/thermal monitoring board for monitoring voltage of the battery cells is mounted on a surface of the upper plate.

9. The battery module assembly according to claim 1, wherein the fastening member is a fastening screw that penetrates the upper plate to be threaded to the other end of one of the side plates.

10. The battery module assembly according to claim 1, wherein an insulation sheet is provided between one of the side plates and the battery module.

11. The battery module assembly according to claim 1, wherein a voltage/thermal monitoring board for monitoring voltage of the battery cells is mounted on a surface of the upper plate.

12. A battery module assembly comprising:
a battery module having a shape of a generally rectangular solid and formed by stacking plural rectangular battery cells;
at least four plates covering the battery module from four directions, the plates including:
a pair of side plates arranged along two side wall faces, opposing to each other in a stacking direction of the battery cells, of the battery module;
a lower plate that swingably supports one end of the pair of side plates by a pair of hinge mechanisms located on corners of the battery module and that is arranged along a lower wall face of the battery module; and
an upper plate that is arranged along an upper wall face of the battery module so as to be opposite to the lower plate, and that connects the other ends of the pair of side plates to each other, wherein
the side plates and the upper plate are tightened and fixed by use of a fastening member with pressure being applied in the stacking direction of the battery cells in order to fix the battery module, wherein:

the battery module is configured by arranging plural physically separate battery holders, each battery holder accommodating one of the battery cells; and
each battery holder is configured such that a predetermined gap is formed between adjacent battery cells, and at least one of the battery holders is formed with a communication window for allowing an explosion-proof window formed on the one battery cell accommodated therein to be exposed to the outside,
two adjacent battery cells of the stacked plural battery cells are accommodated by directly connecting adjacent battery holders of the plural battery holders, one of the adjacent battery holders including a first retaining member and the other of the adjacent battery holders including a second retaining member which is engaged by the first retaining member.

13. The battery module assembly according to claim 12, wherein
when the adjacent battery holders are connected to each other, a semicolumnar pawl formed on each adjacent battery holder are joined to each other to form a columnar projection serving as a positioning projection of the connected adjacent battery holders which is received in a corresponding through-hole formed in one of the upper plate and lower plate.

14. A battery module assembly comprising:
a battery module having a shape of a generally rectangular solid and formed by stacking plural rectangular battery cells;
at least four plates covering the battery module from four directions, the plates including:
a pair of side plates arranged along two side wall faces, opposing to each other in a stacking direction of the battery cells, of the battery module;
a lower plate that swingably supports one end of the pair of side plates by a pair of hinge mechanisms located on corners of the battery module and that is arranged along a lower wall face of the battery module; and
an upper plate that is arranged along an upper wall face of the battery module so as to be opposite to the lower plate, and that connects the other ends of the pair of side plates to each other, wherein
the side plates and the upper plate are tightened and fixed by use of a fastening member with pressure being applied in the stacking direction of the battery cells in order to fix the battery module, wherein
the battery module has a structure in which the battery cells and separators, which are arranged to secure a predetermined gap between the battery cells, are alternately stacked, each of the separators includes a top plate and a bottom plate coupled to the top plate by a pair of side separator plates, and a partition bar spanning between the top and bottom plates,
at least one of the upper plate and the lower plate is formed with penetration slits for passing cooling air flowing between the battery cells, and at least one of the separators is formed with cooling air slits extending through upper and lower plates of the at least one separator and flanking the partition bar, the cooling air slits provided in a position corresponding to the penetration slits.

15. the battery module assembly according to claim 14, wherein at least one of the separators is formed with a positioning projection engaged with a positioning hole formed in one of the upper plate and the lower plate.

16. The battery module assembly according to claim 14, wherein a seat for supporting an electrode plate serving as an output terminal of the battery module is arranged on a surface of the upper plate.

17. The battery module assembly according to claim 14, wherein an insulation sheet is provided between one of the side plates and the battery module.

* * * * *